July 28, 1953     O. H. SCHUCK     2,646,924
COMPUTER FOR ESTIMATED TIME OF ARRIVAL
Filed Nov. 29, 1948     2 Sheets-Sheet 1

FIG. 1

INVENTOR.
OSCAR H. SCHUCK
BY George H Fisher
ATTORNEY

July 28, 1953

O. H. SCHUCK 2,646,924

COMPUTER FOR ESTIMATED TIME OF ARRIVAL

Filed Nov. 29, 1948

INVENTOR.
OSCAR H. SCHUCK
BY
George H Fisher
ATTORNEY

Patented July 28, 1953

2,646,924

UNITED STATES PATENT OFFICE 2,646,924

COMPUTER FOR ESTIMATED TIME OF ARRIVAL

Oscar Hugo Schuck, Minneapolis, Minn., assignor to Minneapolis-Honeywell Regulator Company, Minneapolis, Minn., a corporation of Delaware Application November 29, 1948, Serial No. 62,482

11 Claims. (Cl. 235—61)

This invention relates to the field of air navigation, and more particularly to means giving the pilot of a craft a continuous indication of the time at which he can expect to reach a desired detination, if he continues to approach it at his existing rate. This time is referred to herein as estimated time of arrival, and if the estimated time of arrival of every craft approaching a given airport is known at the control tower while the craft are still some distance away, minor adjustments can be directed to cause the craft to reach the airport in an orderly succession at such intervals as obviate the need for "stacking."

It is an object of the present invention to provide means for obviating stacking of craft at an airport by giving continuous information as to the estimated time of arrival of craft approaching the airport, for radio transmission to the control tower.

It is an object of the invention to provide an improved navigational instrument for computing the estimated time of arrival of a craft when its ground speed and distance to destination are known.

It is another object of the invention to provide radio means for giving outputs in accordance with the ground speed and distance to destination of a craft approaching the radio ground station as a destination, and means for continuously computing the estimated time of arrival of the craft from these outputs and a further output varying with present time, as well as for displaying the estimated time of arrival so computed.

It may happen that several craft are approaching an airport at such distances and rates that their estimated time of arrivals are the same. In such a case, when the reports are received at the control tower, instructions must be given to all but one of these craft to change their approaches so that the proper interval may intervene between their arrival times. The change may be only a moment or two, if the airport is not busy, but it may be that a considerable change may have to be made in the estimated time of arrival of a craft to bring it to the airport at a time when the landing facilities will be free for use.

When a new estimated time of arrival is assigned to the craft, the question arises as to whether it can be flown to make good the new time. Every craft has maximum and minimum safe limits on its air speed, and for any given distance between the craft and the airport these limits determine the earliest and latest times at which a craft in direct flight can reach the airport. For example, a craft having a normal cruising speed of 200 miles per hour can be flown over reasonable periods as fast as 240 miles per hour, or as slow as 140 miles per hour. Higher speeds are dangerous to the engines; lower speeds approach stalling conditions too closely for safety. If a new estimated time of arrival would require an air speed outside these limits, it cannot be accomplished, and a substitute assignment must be requested.

It is a further object of the invention to embody in a device such as previously described, means whereby the displayed estimated time of arrival can be temporarily set to any assigned value, the new ground speed and air speed required to make good the new estimated time of arrival being automatically displayed at the same time.

A further object of the invention is to provide an estimated time of arrival computer in part energized continuously according to the craft's distance to destination, and in part energized alternatively either from an output varying with ground speed, or from a manually adjustable control knob which substitutes an arbitrary variable for the responsive variation in ground speed, and which is also effective when operated to interrupt the normal operation of an airspeed indicator and change its indication by the amount of the arbitrary variation.

Yet another object of the invention is to provide a number of telemetric systems together with switching means for interrelating them in either of two fashions, a first in which a first transmitter drives a first receiver and a second transmitter drives second and third receivers and also drives a third unit as a receiver, and a second in which the first and second transmitters are deenergized, and all receivers are driven by the third unit acting as a transmitter.

Various other objects, advantages, and features of novelty which characterize my invention are pointed out with particularity in the claims and executed to and forming a part hereof. However, for a better understanding of the invention, its advantages, and objects attained by its use, reference should be had to the subjoined drawing, which forms a further part hereof, and to the accompanying descriptive matter, in which I have illustrated and described a preferred embodiment of my invention.

In the foregoing discussion, and in that which follows, the word "arrival" is applied, not in the sense of an airplane coming to rest on the ground at a terminus, but in the sense of an aircraft reaching a particular point in the air from which the final let-down may take place. Let it be assumed that an aircraft is at a distance $y_p$ from its destination or point of arrival, and that its component of movement toward the destination has a value $\dot{y}_p$: this latter quantity is the ground speed of the craft as far as the destination is concerned. Then it is possible to define the time to reach destination, $T_a$, according to the following equation $$T_a = \frac{y_p}{d/dt(y_p)} \quad (1)$$

If the present time is $T_p$, then the estimated time of arrival at the destination if present conditions of flight are maintained, is given by the expression $$E.T.A. = T_p + \frac{y_p}{d/dt(y_p)} \quad (2)$$

It is thus apparent that in order to compute the estimated time of arrival of a craft, it is necessary to know as variables its distance from the destination in question, its ground speed with respect to that distance, and the present time.

Figure 1:
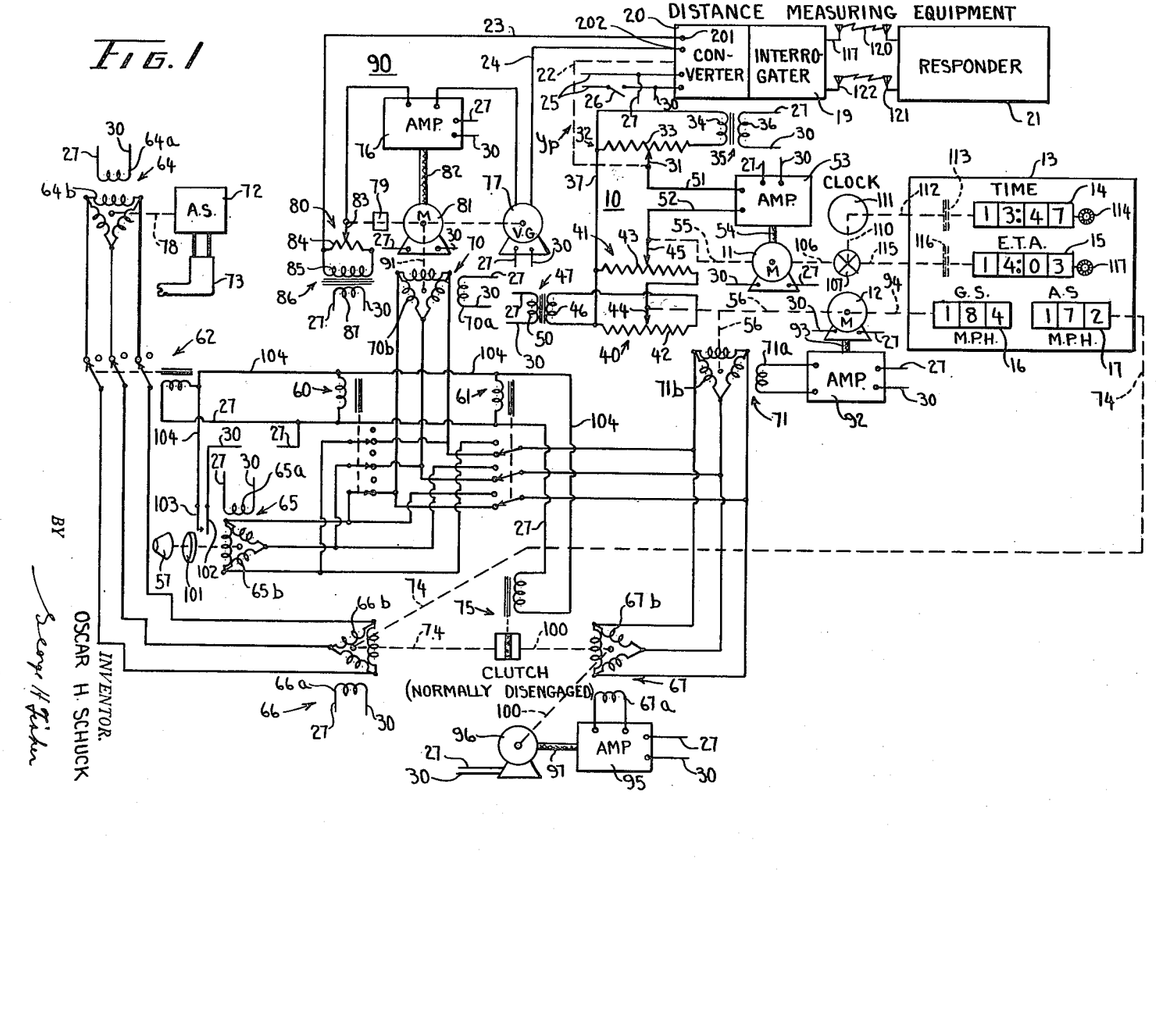
Figure 1 is a diagrammatic showing of the components making up a system according to the invention.

A system for use in practicing the invention is shown in Figure 1. The computer proper is shown to comprise a balanceable network 10, a balancing motor 11, a ground speed motor 12, and a panel board 13 including counter type indicators 14, 15, 16 and 17, which give indication of present time, estimated time of arrival, ground speed, and air speed, respectively.

Distance to destination and ground speed information are provided to the computer from a Distance Measuring Equipment installation, which is shown to comprise an interrogator 19 and a converter 20 carried in the craft, and a responder 21 located at a fixed position on the ground. The distance to destination output from converter 20 appears as mechanical rotation of a shaft 22, and the ground speed output appears as a voltage between a pair of conductors 23 and 24. Converter 20 is energized by connection at 25 to any suitable supply of alternating voltage, controlled by a master switch 26. Connection 25 will hereafter be referred to as a "source" of alternating voltage. Other portions of the system are energized from the same source through conductors 27 and 30. The nature of members 20, 21 and 22 will be recited in more detail in connection with Figure 2.

Rotation of shaft 22 moves the slider 31 of a voltage divider 32 with respect to its winding 33. Winding 33 is connected to the secondary winding 34 of a transformer 35 whose primary winding 36 is energized from source 25 through conductors 27 and 30. The voltage between slider 31 and a conductor 37 connected to one terminal of winding 33 therefore depends upon the position of slider 31 along the winding.

Voltage divider 32 comprises a portion of balanceable network 10, which also includes further potential dividers 40 and 41 having windings 42 and 43 and sliders 44 and 45 all respectively. Winding 42 is connected to the secondary winding 46 of a transformer 47 whose primary winding 50 is energized from source 25 through conductors 27 and 30. Conductor 37 is connected to one terminal of winding 42, and also to one terminal of winding 43, the other terminal of which is connected to slider 44 of voltage divider 40. Slider 45 of voltage divider 41 is thus at a potential, with respect to conductor 37, which depends on the positions of sliders 44 and 45 along their respective windings.

Sliders 31 and 45 are connected to the input conductors 51 and 52 of a motor control amplifier 53, supplied with power from source 25 through conductors 27 and 30. The output of amplifier 53 energizes motor 11 through a suitable cable 54, and motor 11 moves slider 45 with respect to winding 43 through a suitable mechanical connection 55.

Slider 44 of voltage divider 40 is actuated by ground speed motor 12 through a suitable mechanical connection 56. Operation of motor 12 is controlled through a complex telemetric system alternatively the $\dot{y}_p$ voltage appearing between conductors 23 and 24, or by manual operation of a knob 57, the interconnection being controlled by a pair of relays 60 and 61. These relays, together with a further relay 62 and an electromagnetic clutch indicated at 75 control the interrelation of a number of self-synchronous dynamoelectric machines which act as transmitters and receivers in the complex telemetric system. These machines are indicated at 64, 65, 66, 67, 70 and 71. Each machine includes a single-phase winding and a three-phase winding. As shown in connection with machine 64, the single-phase winding is indicated by the reference numeral 64a and the three-phase winding by the reference numeral 64b: the single- and three-phase windings of the other units are indicated by the same suffix letter system.

Single-phase windings 64a, 65a, 66a, and 70a are energized from source 25 through conductors 27 and 30, to provide input energy for the telemetric system. Outputs from the system are obtained from single-phase windings 67a and 71a.

Three-phase winding 64b is rotated by a mechanical connection 76 to an air speed sensing unit 72, connected to the usual Pitot-static tube 73. Winding 64b is connected with winding 65b through relay 62, which functions as a triple-pole single-throw normally closed switch. The voltages at the terminals of winding 64b are determined in amplitude by the rotated position of that winding with respect to winding 64a, and hence by the air speed sensed by member 72. When relay 62 is in its deenergized or normal condition, as shown in Figure 1, these voltages are conducted to the terminals of winding 65b; winding 65a is continuously energized, so winding 65b is driven to a rotated position which is determined by the voltages on the terminals of the windings. At the same time the setting of air speed indicator 17 is also changed, by a mechanical connection 74, and if a given relationship is once established between the positions of windings 64b and 65b, with respect to windings 64a and 65a, and the reading of indicator 17, the reading is thereafter correct for all changes in air speed as sensed by member 72.

Mechanical connection 74 also extends to one side of a normally deenergized electromagnetic clutch 75, which is of the type transmitting mechanical energy only when suitably energized. The clutch is deenergized and energized simultaneously with relay 62, so that when electrical control of winding 65b is interrupted by relay 62, mechanical control of the winding may be brought about through clutch 75.

Ground speed motor 12 is controlled through an intricate circuit including the ground-speed output voltage appearing at conductors 23 and 24 as previously indicated. This voltage is supplied to an amplifier 76, energized from source 25 through conductors 27 and 30, in series with the output from a velocity generator 77 and that from a voltage divider 80. Velocity generator 77 is energized from source 25 through conductors 27 and 30, and is driven by a motor 81 connected to amplifier 76 by a suitable control cable 82. Voltage divider 80 is shown to comprise a slider 83 movable with respect to winding 84 by mechanical connection to motor 81. Winding 84 is energized from the secondary winding 85 of a transformer 86 whose primary winding 87 is energized from source 25 through conductors 27 and 30. Members 76 to 87 inclusive comprise a "smoother" identified by the general reference numeral 90, and functioning to position the shaft of motor 81 in accordance with the general value of ground speed represented by the voltage appearing between conductors 23 and 24, while preventing the motor from following transient erratic changes in that voltage, such as are frequently found to occur in the output from unit 20.

Motor 81 is arranged to drive winding 70b through a suitable mechanical connection 91. The voltages at the terminals of winding 70b are determined by the rotated position of the shaft of motor 81, that is, by the magnitude of the groundspeed signal appearing at conductors 23 and 24.

Relay 60 functions as a triple-pole single-throw switch. In its normal or deenergized condition it completes the circuit from winding 70b to winding 60b, and the position of winding 65b is thus determined by the position of winding 70b. In the energized position of relay 60, this connection is interrupted.

Relay 61 functions as a triple-pole double-throw switch. In the normal or deenergized condition of relay 61, winding 70b is connected to windings 67b and 71b so that the positions of these windings are determined by the position of winding 70b, that is by the ground speed signal appearing between conductors 23 and 24. In the energized condition of relay 61, the connection of windings 67b and 71b to winding 70b is interrupted, and windings 67b and 71b are instead connected to winding 65b: the positions of windings 67b and 71b are now determined by the position of winding 65b. The latter is rotatable by a manual knob 57: relays 60 and 61 are energized at the same time, so that when windings 67b and 71b are connected for control in accordance with the position of winding 65b, the latter is disconnected from its normal control by winding 70b.

Winding 71a is not energized from source 25, but instead is connected to the input of an amplifier 92 energized from source 25 through conductors 27 and 30. Unit 71 thus acts not as a generator, such as unit 64, or as a motor, such as unit 66, but as a transformer, the voltage supplied to amplifier 92 being determined by the rotated position of winding 71b with despect to winding 71a, and the voltages supplied to winding 71b. Amplifier 92 is connected through a suitable cable 93 to control the operation of ground speed motor 12 which acts through mechanical connection 56, not only to move slider 44 along winding 42, but also to readjust the position of winding 71b until the voltage induced in winding 71a becomes zero, when operation of the motor stops. The motor is also connected by a suitable mechanical means 94 to drive ground-speed indicator 16 on panel 13.

Unit 67 also functions as a transformer rather than as a rotating machine, so that the voltage impressed on the input terminals of an amplifier 95 is determined by the rotated position of winding 67b with respect to winding 67a, and the voltages supplied to winding 67b. Amplifier 95 is energized from source 25 through conductors 27 and 30 and controls a motor 96 through a suitable cable 97. Motor 96 acts through a mechanical connection 100 to adjust the rotated position of winding 67b so that no voltage appears in winding 67a. When this condition is reached operation of motor 96 stops. Mechanical connection 100 is also extended to clutch 75. As previously pointed out, this clutch is normally disengaged, so that there is no connection between shafts 74 and 100. Clutch 75 and relay 62 are energized simultaneously, so that in the energized condition unit 66 is electrically disconnected from unit 64 and is mechanically connected to unit 67. Under these conditions air-speed indicator 17 is controlled, through shaft 74, clutch 75 and shaft 100, by motor 96, and its position is thus determined by the rotated position of winding 65b with respect to winding 65a.

Operation of relays 60, 61 and 62 and clutch 75 is initiated and interrupted by a second operation of manual knob 57, which functions through a disk 101 of insulating material, or through other suitable means, to make connection between a pair of normally open contacts 102 and 103. Contact 102 is connected to conductor 30. Contact 103 is connected through a conductor 104 to one terminal of each of relays 60, 61 and 62 and of clutch 75. The other terminals of these relays and the clutch are connected to conductor 27 as shown in Figure 1. Knob 57 is mounted for limited axial movement, to permit disk 101 to cause contact 103 to engage contact 102. When this happens the relays and clutch are actuated, air-speed indicator 17 is disconnected from air-speed sensing unit 72, and control of the voltages on windings 67b and 71b is transferred from motor 81 acting through unit 70 to knob 57 acting through unit 65: at the same time the mechanical connection is completed between units 66 and 67 for controlling air-speed indicator 17.

In addition to controlling the position of slider 45, rebalancing motor 11 also acts to provide a first mechanical input 106 to a differential 107. A second mechanical input 110 is provided to differential 107 from a timer or clock 111, which also provides a mechanical input 112 to drive time indicator 14. Connection 112 may include, if desired, a suitable slip friction device 113 to permit resetting of indicator 14 by a suitable knob 114. The output from differential 107 is supplied as at 115 to indicator 15. This output may also include a slip friction device 116 to permit resetting of indicator 15 by a suitable manual knob 117.

In brief review, present time is displayed on panel board 13 by indicator 14, by direct connection to timer 111. Estimated time of arrival is displayed by indicator 15 on panel board 13, by the joint effect of timer 111 and rebalancing motor 11. Operation of motor 11 is determined by the value of distance to destination, which controls the position of slider 31 in balanceable circuit 10, and the value of ground speed, which determined the position of slider 44. The distance to destination input is supplied through shaft 22 directly by converter 20. The ground speed input is supplied through motor 12, and is indicated on panel board 13 at 16. Operation of motor 12 is controlled alternatively either by manual knob 57, or by motor 81 in smoother 90, which in turn is energized from converter 20. Air speed is indicated at 17 on panel board 13: this indication is normally controlled by airspeed sensing unit 72; alternatively by motor 96, which is alternatively controllable either from motor 81 or from manual knob 57. When motor 96 is controlled from motor 81, however, no use is made of its output, since at this time clutch 75 is disengaged. The normal condition of the system is that existing when knob 57 is not depressed. When the knob is depressed, relays 60, 61 and 62 and clutch 75 are energized, thus making control of motors 12 and 96, and hence of indicators 16 and 17 and slider 44, dependent upon the rotation of manual knob 57. When the knob is allowed to resume its undepressed condition, the normal association of parts will resume, and the telemetric systems again rebalance themselves in their former positions.

Before proceeding to a detailed description of the operation of the system, further consideration must be given to the structure of units 20, 21 and 22, in so far as it bears on an understanding of the present invention.

The term "Distance Measuring Equipment" hereafter will be abbreviated as "D. M. E.," and refers to specific radio apparatus known in the art by that name, and described in the report of the "Third Commonwealth and Empire Conference on Radio for Civil Aviation, 1945," pages 197 to 205. It should be appreciated, however, that the use of this particular device in the present application is illustrative only, and that other suitable device, such for example as a navigating computer, which gives as outputs the distance to destination and the ground speed of a craft, may be used with equal satisfaction.

Interrogator 19 emits spaced radio signals from a transmitting antenna system 117. These signals reach the receiving antenna system 120 of responder 21, and each signal causes the responder to emit a radio signal from a transmitting antenna system 121, which in turn reaches the receiving antenna system 122 of interrogator 19. The delay in responder 21 between reception of a signal and transmission of a signal in response thereto is known, so that the time interval between the transmission of a signal from the interrogator and the subsequent reception at the interrogator of the resulting signal from the responder is proportional to the distance between the two units, if reduced by the delay time. The time interval is converted in interrogator 19 to a voltage from which are derived by converter 20, a mechanical shaft rotation proportional to the distance and a second voltage proportional to the derivative of the distance, that is, to the ground speed of the craft measured in the direction of the responder.

Figure 2:
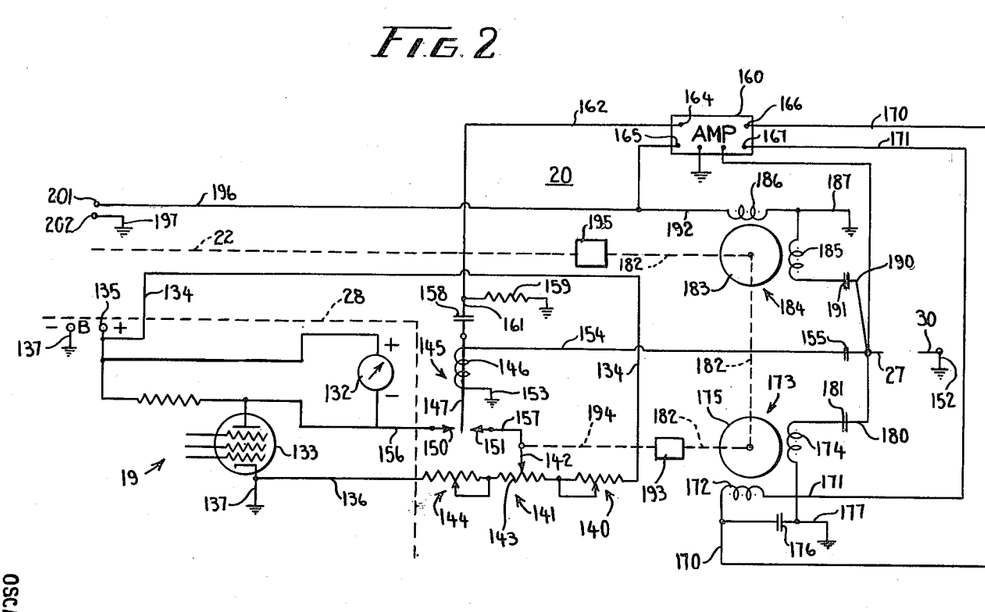
Figure 2 is a fragmentary showing of components making up a portion of the structure of Figure 1.

Converter 20 is shown in Figure 2 with related portions of interrogator 19. The output of the latter is conventionally a voltage applied to a high impedance voltmeter: the purpose of the converter is to derive from this voltage a shaft rotation proportional thereto, without destroying the accuracy of the original system. The interrogator is shown at 19, below and to the left of the dotted line 28; and the voltage in question is impressed on a meter 132, one side of which is connected to the plate of a pentode 133 and the other side of which is connected to the source of plate voltage. The resistance of the pentode is varied by voltages impressed on its control electrodes, by means, not shown, provided therefor, in accordance with the distance being measured, and thus the voltage between the positive terminal of the power supply and the plate is also varied.

The most satisfactory method of motor control is one using a rebalancing or null type of network; such a network must be so designed that the measuring circuit is not loaded down thereby to a point where its accuracy is destroyed. This is accomplished according to the present invention by a comparison arrangement in which first the voltage across the meter and then a comparison voltage is applied to an amplifier of high input resistance, and the amplifier energizes a motor to adjust the comparison voltage to equality with the voltage being measured. The motor shaft rotation also comprises the mechanical output from the converter, since it is a measure of the comparison voltage, which is in turn proportional to the distance being measured.

In order to minimize the effect of change in the supply voltage, the comparison voltage is obtained from the same source. Thus a first conductor 134 is connected to the positive terminal 135 of the power supply and a second conductor 136 is connected to ground, which is the negative terminal of the power supply, at 137. In series between these two conductors there are connected a first variable resistor 140, a potential divider 141 having a slider 142 movable with respect to a linear winding 143, and a second variable resistor 144. The values of resistors 140 and 144 are adjusted so that when meter 132 gives its maximum reading slider 142 is at the same potential as the negative terminal of the meter if the slider is at the left hand end of winding 143, and when meter 132 gives its minimum reading slider 142 is at the same potential as the meter terminal if at the right hand end of the winding: resistors 140 and 144 are thus centering means coordinating the range of slider 142 with the range of voltage available across pentode 133.

The converter includes an interrupter 145 having a winding 146, a movable contact 147, and a pair of fixed contacts 150 and 151. Winding 146 is energized from source 25 through conductor 30, ground connections 152 and 153, a conductor 154, a capacitor 155, and conductor 27 to cause movable contact 147 to oscillate between fixed contacts 150 and 151 at the frequency of the source. Fixed contact 150 is connected to the negative terminal of meter 132 by a conductor 156, and fixed contact 151 is connected to slider 142 by conductor 157. The potential of movable contact 147 is thus alternated between that of fixed contact 150 and that of fixed contact 151, and if the two fixed contacts are not at the same potential a square wave alternating voltage of the frequency of the source appears upon movable contact 147, and is applied to an amplifier 160 through capacitor 158, conductors 161 and 162, and ground. Operation of movable contact 147 is maintained in phase with the voltage supplied by conductors 27 and 30 by means of phasing capacitor 155. A grounded resistor 159 cooperates with a blocking capacitor 158 to separate the A. C. and D. C. input circuits to the amplifier, Amplifier 160 is of the type in which a voltage is obtained at output terminals 166 and 167 which is of the same phase, positive or negative, and the same frequency as the voltage applied to input terminals 164 and 165. The output voltage is impressed by conductors 170 and 171 upon one winding 172 of a two phase motor 173 having a second winding 174 and a rotor 175. The power factor of the motor may be improved by the addition of a capacitor 176 across winding 172. Winding 174 is energized from source 25 through conductor 30, ground connections 152 and 177, phasing capacitor 181, and conductors 180 and 27.

Unitary on the shaft 182 of motor 173 is the rotor 183 of a velocity generator or dynamic transformer 184. This generator has an energizing winding 185 and an output winding 186, the former being energized from source 25 through conductor 30, ground connections 152 and 187, phasing capacitor 191 and conductors 190 and 27. Winding 186 is connected in the input circuit of amplifier 160, which may be traced from terminal 164 through conductors 162 and 161, capacitor 158, movable contact 147, fixed contact 150 (or 151), pentode 133 (or slider 142, a portion of winding 143, and variable resistor 144), ground connections 137 and 187, winding 186, and conductor 192 to input terminal 165.

The output voltage of velocity generator 184 is also supplied to a pair of output terminals 201 and 202 by ground connections 187 and 197 and conductors 192 and 196.

The shaft 182 of motor 175 is connected through reduction gearing 193 to a shaft 194 which actuates the slider 142 along winding 143. Input shaft 22 to the computer is also coupled to motor shaft 182, through reduction gearing 195.

*Operation*

The mode of operation of the structure described above will now be readily understood, reference first being made to Figure 2. For illustration suppose first that a craft is fixed at a point 80 miles from a particular transmitter. In normal operation of the D. M. E., the voltage across meter 132 varies substantially linearly with distance from the station, so that for example the voltage may be 125 volts when the craft is 100 miles from the station and 26 volts when the craft is 1 mile from the station. The voltage between terminal 135 and ground is fixed at say 275 volts, so that the voltage between ground and the plate of the pentode, and hence between ground and fixed contact 150, may vary from 249 volts, when the craft is one mile from the station, to 150 volts, when the craft is 100 miles from the station. Under these conditions the voltage with respect to ground on fixed contact 150, when the craft is 80 miles from the station, is 230 volts. Resistors 140 and 144 are adjusted so that their values and that of winding 143 are in the ratio of 25, 100 and 150 respectively: the potentials at the terminals of winding 143, connected to resistors 140 and resistor 144 respectively, are 250 and 150 volts respectively measured to ground.

Slider 142 has by the prior operation of the system been set at some position along winding 143; if this position happens to be at four-fifths of the length of the winding from the junction point with resistor 144, the slider is at a potential of 150+⅘(100) volts, or 230 volts, with respect to ground, and fixed contact 151 is at this potential. Fixed contact 150 is also at this potential by reason of operation of the D. M. E., and movable contact 147, in moving from fixed contact 150 to fixed contact 151, encounters no change in potential, but remains at a uniform voltage with respect to ground. The movable contact is so adjusted as not to disengage both fixed contacts at the same time, always engaging one contact just before disengaging the other. The fixed voltage between movable contact 147 and ground is prevented from reaching amplifier 160 by blocking capacitor 158: the amplifier is hence de-energized and no operation of motor 173 takes place. Slider 142 remains where it is, shaft 22 does not rotate, and no voltage appears between contacts 201 and 202.

If the position of slider 142 is not four-fifths of the length of the winding from the junction point with resistor 144, the slider is at some other potential than 230 volts with respect to ground. If the slider is too near the junction point with resistor 140, fixed contact 151 is at a potential higher than fixed contact 150, and movable contact 147 alternates between a potential to ground of 230 volts and one of say 240 volts. This in effect applies a square wave voltage of 5 volts peak amplitude to the input of amplifier 160 through capacitor 158, which as before blocks out the continuous 235 volt component of the square wave. The frequency of the square wave is that of source 25, since the vibrator is energized from that source and operates synchronously with it.

The fundamental component of the square wave is amplified and impressed by amplifier 160 on winding 172 of motor 173. By reason of phasing capacitor 155 the movement of vibrator 145 is brought into a desired phase relation with the voltage of the source such that under the foregoing conditions the voltage across winding 172 is exactly in phase for example with the voltage of the source. The voltage across winding 174, on the other hand, lags that of the source by 90°, by reason of quadrature capacitor 181. Motor 173 is constructed, as is well known in the art, so that when windings 172 and 174 are energized with alternating voltages in quadrature, a rotating field is set up and the motor operates, the direction of operation being determined by which of the voltages leads the other. The connections of winding 174 to capacitor 181 and ground 177 are so made that motor 173 operates in the direction to drive slider 142 to the left as seen in Figure 2, thus reducing the voltage on fixed contact 151 until it has the same value as that on contact 150, the A. C. input to amplifier 160 from movable contact 147 decreasing at the same time.

When motor 173 begins to operate, velocity generator 184 begins to supply an output voltage. This generator is of the type which supplies an output increasing in amplitude but not in frequency as the speed at which it is driven increases. The arrangement is basically a transformer of which winding 185 comprises the primary and winding 186 the secondary, the transfer of energy between the windings being substantially zero for no rotation of the rotor and increasing as the speed of the rotor increases. The voltage output from secondary winding 186 is brought into substantial 180° phase relation to the voltage at source 25 by phasing capacitor 191, and is connected into the input circuit of amplifier 160 in such a fashion as to oppose the voltage from movable contact 147.

The actual input voltage to the amplifier is thus reduced by the output of the velocity generator, this in turn reducing the output from the amplifier and the amount of energization of the motor. A condition of equilibrium is reached in which, for a constant signal voltage, the motor runs at a constant rate such that the constant output from the velocity generator combined with the signal voltage gives a constant input voltage to the amplifier. For a uniformly decreasing distance voltage, the condition of equilibrium is that in which the motor moves at a uniform speed such that the output from the velocity generator combined with the signal voltage which represents the difference between the distance voltage on contact 150 and the rebalance voltage on contact 151, gives a uniform input voltage to the amplifier. If the motor runs at a faster speed, the velocity generator output voltage increases, reducing the signal to the amplifier and so slowing down the motor. If the motor runs at a slower speed the signal voltage increases, increasing the signal to the amplifier and so speeding up the motor. The velocity generator output voltage is determined by the turns ratio and the amplitude of the voltage supplied to the primary winding.

If the slider 142 happens to be too near the center of winding 143 instead of too near the junction point with resistor 140, fixed contact 151 is at a potential lower than fixed contact 150, and movable contact 147 alternates between a potential to ground of 230 volts and one of said 220 volts. The movable contact engages the respective fixed contacts at the same points in the cycle of source 25 as before, but now the relative polarities of the contacts is reversed and the square wave transmitted to amplifier 160 through capacitor 158 is of the opposite phase to that previously described. The phase of the output of amplifier 160 accordingly reverses, reversing the phase of the voltage across winding 172 of motor 173. The phase of winding 174 remaining constant, this results in reversal of the operation of motor 173, moving slider 142 to the right as seen in Figure 2 to reduce the voltage difference between fixed contacts 150 and 151 to zero, and also reversing the direction of operation of shaft 22 and the phase of the output of velocity generator 184, so that it can again cooperate in opposition with the signal voltage to give antihunt operation of the system.

The output voltage of velocity generator 184 is not only applied to amplifier 160 to give antihunt properties to the system, but is also applied to terminals 201 and 202. The initial operation of the system thus far disclosed takes place very rapidly, and is preliminary to the operation of the system in use, which will now be described.

Heretofore it has been assumed that the craft is at a point fixed in space. Actually, of course, this is not true: the craft is moving and its motion has a component in the direction of the line joining the craft and the station. If the craft is moving along the line, there is no other component, and this is contemplated as the preferable mode of operation of the invention. The airspeed of a craft is normally maintained constant by the pilot, and hence for a constant wind the distance from the transmitter to a craft approaching the transmitter decreases at a uniform rate. This means that the voltage on fixed contact 150 also decreases at a constant rate, and that for the equilibrium conditions in the amplifier input-output system the motor must run at such a constant rate as will give a constant input signal to the amplifier to energize the motor. The velocity generator output voltage, being proportional to the speed of the motor, is accordingly a measure of the rate of change of distance to the transmitter, or of ground speed toward the station.

The amount of rotation of shaft 22 is a measure of the actual distance of the craft from the transmitter, the slight "droop" in the system required to continuously energize motor 173 being negligible. Converter 20 thus supplies a mechanical output at shaft 22 proportional to the distance from the craft to the responder, and an electrical output proportional to the rate of change of that distance. If the air speed changes the rate of movement of slider 142 and shaft 22 becomes proportional to the new air speed.

Referring now to Figure 1, the terminals 201 and 202 and the shaft 22 of converter 20 are shown associated with elements of the computer. Shaft 22 is shown as driving slider 31: when the position of shaft 22 corresponds to a distance of 100 miles between the craft and the transmitter, slider 31 is at the right-hand end of winding 33, and the slider moves from one end of the winding to the other as the position of shaft 22 moves into correspondence with a distance of 0 miles between the craft and the transmitter. This relation is brought about by selection of a proper ratio for reduction gearing 193 and 195 of Figure 2.

The voltage at terminals 201 and 202 comprises a ground speed input to the computer, and is to determine the rotated position of winding 70b. To accomplish this the ground speed signal is opposed by a rebalance signal derived from voltage divider 80, the position of whose slider is determined concurrently with the position of winding 70b by operation of motor 81. The ground speed signal is further opposed by a velocity-proportional signal from velocity generator 77 associated with motor 81. If for any given voltage appearing at terminals 201 and 202 there is a voltage between conductor 23 and slider 83 equal and opposite thereto, no input voltage is supplied to amplifier 76, no energization of motor 81 and no change in the position of slider 83 occurs and no output is supplied by velocity generator 77. Winding 70b therefore remains in the same position, and a voltage from winding 70a is inductively supplied therethrough to winding 71b, fixed in position by motor 12, and hence inductively to amplifier 92 depending on the rotated position of winding 71b.

For a unique position of the latter winding the voltage transmitted to winding 71a is zero, amplifier 92 is not energized, no operation of motor 12 occurs, and slider 44, winding 71b and indicator 16 remain in the same positions. For any other position of winding 71b the voltage induced in winding 71a energizes amplifier 92, and operation of motor 12 is initiated, in a direction to rotate winding 71b so as to decrease and finally remove the signal in winding 71a: when this has been accomplished, operation of motor 12 ceases and slider 44 and counter 16 remain in the new positions to which the operation of the motor has brought them.

If the voltage between slider 83 and conductor 23 is not equal and opposite to that between terminals 202 and 201, a resultant voltage appears as an input to amplifier 76, which energizes motor 81 as described in connection with motor 173. The motor operates until slider 83 has taken some new position in which the two voltages become equal, at the same time rotating winding 70b with respect to winding 70a. Velocity generator 77 acts as described in connection with generator 184, to give the system antihunt properties; however, the turns, ratio and excitation of velocity generator 77 are chosen to give a higher output voltage than is needed merely to prevent hunting. As a consequence, the response of motor 81 to rapid changes in the input signal on conductors 23 and 24 is reduced, thus giving a "smoothing" effect.

Rotation of winding 70b results in a different distribution of voltages of the winding, and hence in winding 71b. A voltage is induced in winding 71a which is of the proper phase to cause operation of motor 12 in a direction to move slider 44 to the right if movement of slider 83 to the right is being caused by motor 81, and to increase the reading of indicator 16.

Slider 44 is to be moved from one end to the other of winding 42 when the ground speed varies between zero and some selected maximum value such as 300 M. P. H., being in contact with the end of the winding connected to conductor 37 for zero ground speed, and the indications of indicator 16 are also to vary through the same range at the same time. Movement of slider 83 from one end of winding 84 to the other corresponds to variation in the voltage between terminals 201 and 202 from zero to a value proportional to 300 M. P. H., and occurs simultaneously with rotation of winding 70b through 360° or less. This rotation requires the same angular rotation of winding 71b to maintain the output from winding 71a constant, and this rotation of winding 71b must be accomplished during movement of the slider 44 the length of winding 42, and must be accompanied by movement of indicator 16 between readings of zero and 300 miles per hour. In order to accomplish this, mechanical connections 56, 91, and 94 may include reducing gearing of the necessary ratios, the ratio of reducing gearing 79 being considered.

The system is set up so that, for a known ground speed of the craft, as determined in any suitable manner, the ground speed indicated by indicator 16 is correct, and the displacement of slider 44 along winding 42 from conductor 37 has the same relation to the total available displacement of the slider as does the known ground speed to 300 M. P. H.

Whenever winding 70b is rotated, the same change in voltage distribution which effects winding 71b as described above also effects winding 67b, and in the same fashion a voltage is induced in winding 67a energizing amplifier 95 to cause operation of motor 96 in a direction to reduce the induced voltage to zero. When this has been done rotation of motor 96 stops. The rotation of the motor drives one side of clutch 75, but since the latter is in its deenergized condition no change in the system as a whole results.

In order that network 10 may be consistent within itself, and operate on the same "scale," proper values must be selected for the voltages applied to windings 33 and 42. Assuming a scale of 1 volt per mile, the voltage output from transformer 35 must be 100 volts; assuming a scale of one volt per M. P. H., the voltage output from transformer 47 must be 300 volts. Accordingly, movement of slider 45 from one end of winding 43 to the other end represents a range for $T_a$, the time until arrival, of 0 to 1 hour.

In the balanceable network the voltage between slider 31 and conductor 37 is proportional to $y_p$. The voltage between slider 45 and conductor 37 is a portion of $\dot{y}_p$, that between slider 44 and conductor 37, determined by the ratio of the displacement of slider 45 from conductor 37 to the total available displacement of the slider. The ratio just named is proportional to the $T_a$ in Equation 1 on the same basis that the voltages from sliders 31 and 44 to conductor 37 are proportional to $y_p$ and $\dot{y}_p$ respectively. The difference between the voltages from sliders 31 and 45 will be zero only when slider 45 is brought to a position where the equation is satisfied. When this condition prevails there is no input to amplifier 53, motor 11 is not actuated, and slider 45 remains motionless. For any other voltage relationship, motor 11 is energized for operation in a direction to move slider 45 so that the voltage difference becomes zero, at the same time supplying a mechanical input through differential 107 to drive indicator 15.

Before the system is put into operation on any flight, clock 111 must be in operation and indicator 14 set to the correct time by knob 114. The clock drives indicator 15 through differential 107, and this indicator must also be set to correct time by knob 117. Thereafter when this system is put into operation as described above, motor 11 is operated to balance network 10 and simultaneously adjusts indicator 15 through differential 107, adding to the reading of the indicator an amount $T_a$ so that indicator 15 now gives estimated time of arrival. Mechanical connections 55 and 106 may be provided with suitable reduction gearing to make this possible. As the craft continues in flight for an interval the $T_p$ component of estimated time of arrival is continuously corrected by clock 111, and the $T_a$ component is continuously corrected by motor 11.

Air-speed indicator 17 is actuated by operation of motor 66, in accordance with the responses of air-speed sensing unit 72. For any value of air speed there is a unique position of winding 64b and hence a unique distribution of voltages from winding 64a to winding 64b. The same voltage distribution is conductively supplied to winding 66b, and since windings 64a and 66a are energized from the same source, winding 66b is caused to rotate into the same position as winding 64b. Suitable reduction gearing may be provided in mechanical connections 74 and 78, to cause the air-speed indicator 17 to read the actual air speed as sensed by unit 72. From the structure thus far described it is apparent that indications are obtained on panel board 13 of the present time, the estimated time of arrival at a given destination, the ground speed being made good toward the destination and the indicated air speed. The estimation of time of arrival is of course dependent on the assumption that ground speed toward the transmitter will continue at the rate presently prevailing. If by reason of unanticipated head winds the craft does not approach the transmitting station as rapidly as was anticipated, the reading on indicator 16 will decrease, and that on indicator 15 will increase faster than that on indicator 14, thus indicating a later estimated time of arrival. Normally the pilot would exercise his power to change his groundspeed and restore the desired estimated time of arrival but conditions may arise when this becomes impossible. Under these conditions it may be necessary for the pilot of the craft to establish communications with the control operator at the airport of destination, indicating that he will not be able to make good his estimated time of arrival and requesting the assignment of a new time of arrival which will permit him to land without interference with the operation of other craft in the vicinity.

Upon being assigned a new estimated time of arrival, it is desirable that the pilot be able to determine in a quick and simple manner whether or not it is within the capabilities of his craft to make good the new estimated time of arrival. The latter may be found to require speed from the craft which it is incapable of supplying, or it may require the craft to slow down to such an extent that if simple straight line flight were continued the safety of the craft and its occupants would be in danger, so that circling or some other time consuming maneuver should be begun. The method by which the pilot may make such determinations will now be explained.

Suppose the conditions of flight of a craft are those shown in the panel board in Figure 1, and suppose further that the pilot is contacted by the traffic control officer at the destination and is instructed to change his operation to make good an estimated time of arrival of 13:57

The board shows a ground speed of 184 miles per hour and a difference in time of 16 minutes between the present time and the estimated time of arrival: this means that the craft is 49 miles from its destination. To see whether the new estimated time of arrival can be achieved, the pilot simply pushes knob 57 to the right as seen in Figure 1, simultaneously rotating the knob and watching indicator 15.

The axial movement of knob 57 engages contacts 102 and 103, the circuit energizing relays 60, 61 and 62 and clutch 75. Operation of relay 62 disconnects winding 66b from energization by winding 64b: thus although winding 66a is still energized no force acts to rotate shaft 74. Operation of relay 60 disconnects winding 65b from energization by winding 70b. Operation of relay 61 disconnects windings 67b and 71b from energization by winding 70b, and connects them instead for energization by winding 65b. Energization of clutch 75 mechanically connects shafts 74 and 100, so that rotation of winding 67b results in rotation of winding 66b and adjustment of indicator 17.

Transfer of control of windings 71b and 67b from winding 70b to winding 65b has no immediate effect, since until relay 60 was operated winding 65b was electrically maintained in step with winding 70b, which controlled windings 67b and 71b. However, when knob 57 is now rotated the distribution of voltages in winding 65b is altered and these voltages, appearing at windings 71b and 67b, cause rotation of these windings. Amplifier 92 is energized, motor 12 operates to adjust winding 71b to a new position in which the voltage induced in winding 71a is zero, indicator 16 is set to a new reading, and slider 44 is adjusted to a new position on winding 42. By this means the voltage across winding 43 is changed, the input to amplifier 53 is no longer zero, and motor 11 is energized to adjust slider 45 until the input becomes zero, and to alter the reading of indicator 15. This process is continued until indicator 15 reads 13:57 as assigned: for this condition indicator 16 reads 294 M. P. H.

Amplifier 95 is also energized, causing operation of motor 96 to rotate winding 67b until the input to the amplifier is zero, and driving shaft 74, winding 66b, and indicator 17. The circuits for motor 12 and 96 are equivalent, so that for each mile per hour change in the reading of indicator 16 brought about by motor 12, a change of 1 mile per hour in the reading of indicator 17 is brought about by motor 96. The panel board now gives readings of 13:57, 294, and 282 for estimated time of arrival, ground speed, and air speed respectively. The pilot observes indicator 17, concludes that it is impossible for him to operate his craft at such an air speed, and requests another assignment of estimated time of arrival. He also releases knob 57, which permits disengagement of contacts 102 and 103 by means of any suitable spring or other arrangement, thus deenergizing relays 60, 61, and 62 and clutch 75.

During this period winding 64b has been maintained in a position representative of indicated air speed by sensing unit 72, and winding 70b has been maintained in a position representative of ground speed by motor 81: windings 65b, 66b, 67b and 71b have been rotated out of positional agreement with windings 64b and 70b, from which they have been disconnected. Deenergization of the relays now restores the connections between windings 66b and winding 64b, and also restores the connections between winding 70b and windings 65b, 67b, and 71b. Deenergization of clutch 75 removes the interconnection between windings 66b and 67b. The various telemetric systems now return to the positions shown in Figure 1, except that lapse of time changes the readings of indicators 14. This process may be repeated until an estimated time of arrival within the capabilities of the craft is assigned, after which the air speed of the craft must be changed by the pilot until the newly assigned estimated time of arrival is shown on indicator 15.

In the foregoing specification I have clearly described apparatus shown in the drawing for determining the estimated time of arrival of a craft moving toward a destination where there is a D. M. E. responder, by means responding automatically to a D. M. E. interrogator in the craft to give outputs proportional to the craft's ground speed and its distance from the destination. I have also shown adjuncts to the above apparatus making it possible to determine in a simple manner, without mental or other computations, whether any assigned estimated time of arrival can be achieved by the craft under the conditions of distance and time remaining, and the known operating limits of the craft. The relationship between the invention as a whole and known components such as the D. M. E. has been clearly pointed out and shown in the drawing, and numerous advantages and objects of the invention have been discussed. The disclosure, however, is illustrative only, and I may make changes in detail, within the principle of the invention, to the full extent indicated by the broad general meaning of the terms in which the appended claims are expressed.

I claim as my invention:

1. In a device of the class described, in combination: means responsive to the ground speed of a craft in a selected direction; means responsive to the distance, in said direction, from a craft to a destination; an indicator; a balanceable system including components adjustable in accordance with the responses of said responsive means and a further component variable to balance said network for various adjusted conditions of said components; means responsive to present time; and means actuated by said last named means and by any unbalance of said system to simultaneously rebalance said system and operate said indicator to an indication of the estimated time of arrival of said craft at said destination.

2. In a device of the class described, in combination: means supplying a first voltage varying only with ground speed; means supplying a second voltage proportional to distance to a destination, means comparing a variable portion of said first voltage with said second voltage; means adjustable to vary the magnitude of said portion until it is equal to said second voltage, so that the magnitude of said portion is a measure of the interval before the destination is reached; a timer; and means actuated in accordance with the magnitude of said portion and with the operation of said timer for indicating the estimated time of arrival at said destination.

3. In a device of the class described, in combination: a Distance Measuring Equipment installation including an interrogator and a responder; means deriving from said interrogator signals proportional to its distance from said responder and to the rate of change of said distance; a timer; indicators of ground speed and estimated time of arrival; means normally operating said ground speed indicator from the rate of change signal of said interrogator; and means operating said estimated time of arrival indicator in accordance with operation of said timer and said ground speed indicator and with the distance signal from said interrogator.

4. In a device of the class described, in combination: means giving an output proportional to the air speed of a craft; means giving an output proportional to the ground speed of said craft; means giving an output proportional to said craft's distance to a destination; means giving an output proportional to present time; means actuated in accordance with the three last named outputs to compute the craft's estimated time of arrival at said destination; means displaying said air speed, said ground speed, and said estimated time of arrival; and means actuable to substitute an arbitrary output for said second named output for bringing said displayed estimated time of arrival to a desired value, and to simultaneously vary said displayed ground speed and air speed by equal amounts.

5. In a device of the class described in combination: a ground speed indicator, an air speed indicator; means normally operating said indicators in accordance with the ground speed and air speed respectively of a moving craft; and means including a manually operable member for first interrupting said normal relation and then causing simultaneous operation of both said indicators.

6. In a device of the class described in combination: a ground speed indicator, an air-speed indicator; means normally operating said indicators in accordance with the ground speed and air speed respectively of a moving craft; an estimated time of arrival indicator; means giving an output proportional to the distance to the destination of the craft; means operating said last named indicator in accordance with said output and with operation of said ground speed indicator; and means interrupting said normal relation and independently causing simultaneous operation of said ground speed indicator and said air-speed indicator, to bring said estimated time of arrival indicator to a desired indication.

7. In a device of the class described, in combination: a distance measuring equipment installation including an interrogator; means deriving from said interrogator signals proportional to its distance from a point of destination and to the rate of change of said distance; a timer; an air-speed sensing unit; indicators of air speed, ground speed, and estimated time of arrival; means normally operating said air-speed indicator from said air-speed sensing unit; means normally operating said ground speed indicator from the rate of change signal of said interrogator; means operating said estimated time of arrival indicator in accordance with operation of said timer and said ground speed indicator and with the distance signal of said interrogator; and means operable to prevent said air-speed sensing unit and said interrogator rate of change signal from affecting said air-speed and ground speed indicators and to independently operate said indicators simultaneously to indications corresponding to a desired indication of estimated time of arrival.

8. In a device of the class described, in combination: an air-speed responsive device; an air-speed indicator; means normally connecting said indicator for operation by said device; means giving a signal proportional to ground speed; a ground speed indicator; means normally connecting said ground speed indicator for operation by said signal; means giving an output proportional to distance to destination; a balanceable network including first and second impedance means, variable in accordance with said distance output and with the operation of said ground speed indicator respectively, and motor variable impedance means; motor control means regulating the operation of said motor to adjust said motor adjusted impedance means so as to balance said network; timing means; an indicator of estimated time of arrival; means connecting said last named indicator for operation by said motor and said timing means; a manually operable member; and means actuated upon operation of said member to disable said first and second named connecting means and to cause simultaneous operation of said air-speed indicator and said ground speed indicator independent of actual air speed and ground speed, to cause a desired change in said estimated time of arrival indicator.

9. In a device of the class described, in combination: means giving an output proportional to the air speed of a craft; means giving an output proportional to the ground speed of said craft; means giving an output proportional to said craft's distance to a destination; means giving an output proportional to present time; means actuated in accordance with the three last named outputs to compute the craft's estimated time of arrival at said destination; means displaying said air speed, said ground speed and said estimated time of arrival; means effective when actuated to substitute an arbitrary output for said second named output, for bringing said displayed estimated time of arrival to a desired value, and to simultaneously vary said displayed ground speed and air speed by equal amounts, and effective when deactuated to cause return of said displayed quantities to their former values.

10. In a device of the class described, in combination: means giving an output proportional to the ground speed of said craft; means giving an output proportional to said craft's distance to a destination; means giving an output proportional to present time; means actuated in accordance with said outputs to compute the craft's estimated time of arrival at said destination; means displaying said present time, said ground speed, and said estimated time of arrival; and means actuable to substitute an arbitrary output for said first named output for bringing said displayed estimated time of arrival to a desired value, and to simultaneously vary said displayed ground speed.

11. In a device of the class described, in combination: a ground speed indicator; means normally operating said indicator in accordance with the ground speed of a moving craft; an estimated time of arrival indicator; means giving an output proportional to the distance to the destination of the craft; means operating said last named indicator in accordance with said output and with operation of said ground speed indicator; and means interrupting said normal relation and independently causing operation of said ground speed indicator, to bring said estimated time of arrival indicator to a desired indication.

OSCAR HUGO SCHUCK.

References Cited in the file of this patent

UNITED STATES PATENTS

| Number | Name | Date |
|---|---|---|
| 1,637,039 | Hewlett et al. | July 26, 1927 |
| 1,994,949 | Huebner et al. | Mar. 19, 1935 |
| 2,113,436 | Williams | Apr. 5, 1938 |
| 2,115,086 | Riggs | Apr. 26, 1938 |
| 2,311,005 | Thurlow | Feb. 16, 1943 |
| 2,416,223 | Sanders | Feb. 18, 1947 |
| 2,425,317 | Harris | Aug. 12, 1947 |
| 2,432,939 | Sanders, Jr. | Dec. 16, 1947 |
| 2,484,463 | Field et al. | Oct. 11, 1949 |
| 2,500,545 | Herbst | Mar. 14, 1950 |
| 2,582,588 | Fennessy et al. | Jan. 15, 1952 |